United States Patent [19]

Oldham

[11] 4,094,950
[45] June 13, 1978

[54] METHOD AND APPARATUS FOR FORMING A SOLE ON AN UPPER BY DIP-COATING

[75] Inventor: Frederick Oldham, Pinetown, South Africa

[73] Assignee: Robert Tilden Clark, Brighton Beach, South Africa

[21] Appl. No.: 793,422

[22] Filed: May 3, 1977

[30] Foreign Application Priority Data

May 6, 1976 South Africa .................. 76/2707

[51] Int. Cl.² .................. B29C 13/00; B29C 5/00
[52] U.S. Cl. .................. 264/259; 264/244; 264/301; 425/93; 425/119; 425/129 S
[58] Field of Search .................. 264/244, 305–308, 264/303, 259, 261, 301; 425/93, 119, 129 S, 130, 269, 270, 275, 502; 12/142 RS

[56] References Cited

U.S. PATENT DOCUMENTS

| 762,024 | 6/1904 | Butterfield | 425/119 |
| 1,867,881 | 7/1932 | Crockett | 264/305 |
| 2,617,208 | 11/1952 | Marx et al. | 264/305 |

*Primary Examiner*—Willard E. Hoag
*Attorney, Agent, or Firm*—Cushman, Darby & Cushman

[57] ABSTRACT

A system is disclosed for making articles of footwear by the so-called dipping process. The system comprises placing under a last a mould for a sole and/or heel. When the last and mould are dipped in molten plastics material, the material solidifies to form a thin skin on the last in the usual way and is contained in the mould until it sets to form the relatively heavy sole and/or heel. The mould contains the molten plastics either by virtue of being provided with peripheral walls or, for thinner soles, by virtue of friction preventing the molten material from escaping. The mould may be constituted by an element to which the plastics material adheres and becomes part of the sole unit.

7 Claims, 6 Drawing Figures

U.S. Patent     June 13, 1978     4,094,950
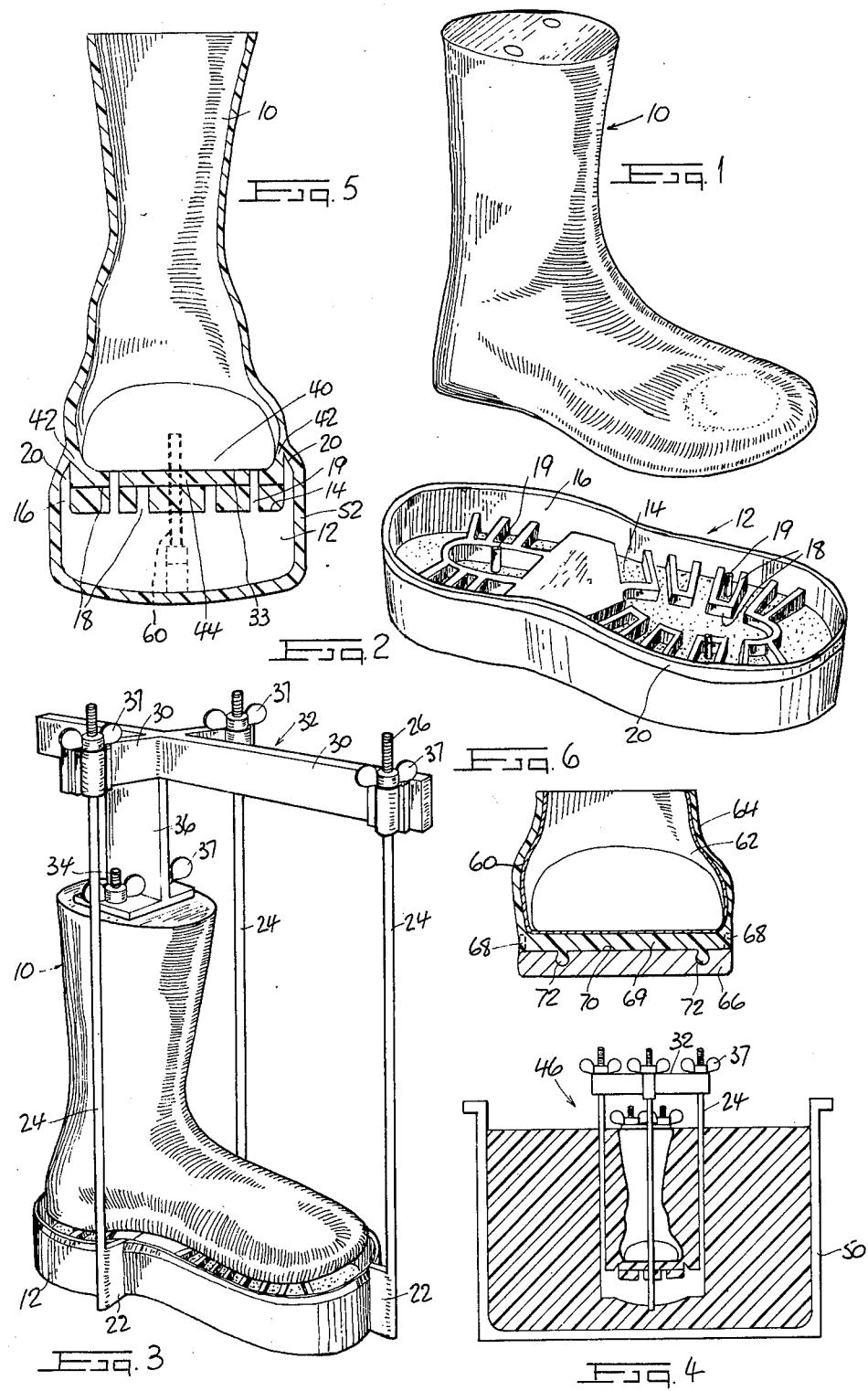

METHOD AND APPARATUS FOR FORMING A SOLE ON AN UPPER BY DIP-COATING su

This invention relates to the manufacture of footwear and it is an object of the invention to provide a novel method of manufacturing footwear.

Having regard to the antiquity of the art of manufacturing footwear a relatively recent innovation is the moulding of a complete shoe, boot or the like as a homogeneous unit, i.e. with the sole and heel moulded integrally with the upper. This method has become widely used for articles of footwear made of the modern plastics materials such as polyvinylchloride (PVC) and the like. Conventionally, such plastics have been injection moulded. This process necessitates the use of a substantially closed die or mould, the molten plastics material being injected into the cavity of the die.

There are two disadvantages associated with the injection moulding of articles of footwear. First, the dies and the injection moulding machinery require the outlay of a considerable amount of capital. Second, at places such as the soles of such articles which undergo a considerable degree of flexing in use the plastics material has a tendency to fail or crack along the lines of grain growth. The type of grain growth leading to such failure inevitably takes place in any injection moulding process.

Another method of making articles using plastics materials is the so-called dipping method. This method involves the step of dipping a last or core into a bath of molten plastics material under controlled conditions. The molten material flows around the last and forms a film which adheres to the last when it is removed from the bath. This film is removed from the last and, after subsequent gelling and curing, constitutes the finished article.

Some types of boots or shoes have the uppers or shells formed from plastics using the dip-coating method. When using this method of dipping a shaped core or last into the molten fluid or paste it has not been possible conventionally to build up a film thickness greater than about 5mm of finished product before stripping from the last. Thus, an important disadvantage of the method is that it has been necessary to attach a separately manufactured sole and heel to the upper or shell, to achieve the usual standards of thickness and design for normal footwear. However, the dipping method has the advantages that it requires a much lower capital investment than the injection method and articles of footwear made by the dipping method are less prone to cracking as previously described owing to more favourable grain distribution.

It is an object of the invention to provide a novel method of making an article of footwear having a sole unit at least part of which is formed integrally with the upper. Hereafter in this specification and the claims, the term 'sole unit' means the sole proper and the heel of an article of footwear and further includes where necessary elements joining the sole proper and heel to the rest of the article. It is not intended that the term shall be restricted to a unit in which the sole proper and heel are in one piece since the scope of the invention covers the case of an article of footwear with an integrally formed heel by itself or with an integrally formed sole proper by itself.

According to the invention, a method of producing an article of footwear comprising a sole unit including a sole proper and a heel includes the steps of positioning an element adjacent the bottom of the last with a space therebetween, and dipping the element and last together in a bath of plastics material, the element being such that the plastics material flows into the space and is retained therein by the element until the material has solidified and constitutes at least part of the sole unit of the article.

Further according to the invention apparatus for producing an article of footwear comprising a sole unit including a sole proper and a heel includes a last and an element which may be positioned adjacent the bottom of the last with a space therebetween, the element being such that, when the element and the last together are dipped into a bath of plastics material, plastics material flows into the space and is retained therein by the element until the material has solidified and constitutes at least part of the sole unit of the article.

According to one aspect of the invention, the element is a mould for moulding the said part of the sole unit.

According to a second aspect of the invention, the element is a preformed part of the sole unit.

In one form the mould is provided with walls around the periphery thereof, for retaining the plastics material.

The scope of the invention extends to an article of footwear whenever it is produced by the method or the apparatus described herein.

An embodiment of the invention is described with reference to the accompanying drawings, in which FIG. 1 is a perspective view of a last;

FIG. 2 is a perspective view of an open topped female mould for a sole unit;

FIG. 3 is a perspective view of the last mounted over the mould;

FIG. 4 is a schematic sectional view of the assembly shown in FIG. 3 dipped into a bath of plastics material;

FIG. 5 is a somewhat schematic cross sectional elevation through the formed article of footwear with the mould and the last still in position;

FIG. 6 is a view similar to FIG. 5 of a second article of footwear.

In FIGS. 1 to 5 of the drawings, there is shown a last 10 which is substantially identical to a conventional last for making a boot. An open topped female mould 12 is provided for use with the last. This mould is in essence a bath with a floor 14 which is an exact reverse impression of the sole unit of the boot, walls 16 arising all around from the periphery of the floor 14. Transverse and longitudinally extending webs 18 also arise from the floor, extending between the walls but not being as high as the walls. Three distance pieces 19 are set into the floor 14 or the mould. The height of the distance pieces is intermediate that of the webs 18 and walls 16. The function of the webs and distance pieces is discussed hereafter.

The upper edges of the walls 16 are tapered as at 20 for a purpose which will also be discussed later.

Fixed to the outer sides of the walls 16 are lugs 22 shown in FIG. 3 but not FIG. 2. These lugs carry vertically disposed rods 24, screw-threaded at their upper ends as at 26. These rods pass through the arms 30 of a bracket 32 from which the mould 12 and the last 10 are suspended in fixed position relative one to the other. The top of the last carries screw-threaded studs 34 by means of which the last is fixed on an arm 36 of the bracket 32. Wing nuts 37 mounted on the threaded upper ends of the rods and studs keep the mould and the last on the bracket 32.

As may be seen in FIG. 5, the lower part 40 of the last is located below the upper edges of the walls 16 of the mould with the bottom face 33 of the last seated on the distance pieces 19. A small but carefully controlled gap 42 is left between the last and the walls of the mould. This gap is left all round and in fact there is a clear space 44 between the last and the cavity of the mould. The width of the space is determined by the height of the distance pieces 19. As will be explained below the disposition of the upper edges of the walls above the bottom of the last and the width of the space between the bottom of the last and the floor 14 of the mould must be carefully controlled.

In the carrying out of the invention, two lasts and two moulds, one pair for a left hand boot and the other pair for a right hand boot, are invariably mounted on a bracket similar to the bracket 32, but since the two pairs are substantially similar, it is considered sufficient to describe only one pair. The last 10 and mould 12 mounted on the bracket 32 (all of which for convenience will be called the assembly 46) are suspended from a conventional conveying apparatus which is not shown in the drawings since this is a known item of equipment. The conveying apparatus is arranged to transport the assembly 46 over a bath 50 of molten polyvinylchloride (PVC) and to dip the assembly into the PVC for a controlled amount of time before withdrawing it. In this time, PVC solidifies on all the exposed surfaces of the last and the mould. Liquid PVC also flows through the gap 42 to fill the mould 12 and the space 44 and thereafter solidifies.

After the assembly 46, now including an integral boot, is removed from the bath by the conveying apparatus, the solidified material 52 around the outside of the mould is cut away along the tapered upper edges 20 of the mould walls 16 (see FIG. 5). The boot is now heat cured in the conventional manner. The mould is detached from the bracket 32 and the raw boot (still containing the last). The bracket is detached from the last and the boot is removed from the last in a conventional manner by blowing compressed air into the interior of the boot to drive the boot off the last.

The holes left in the sole unit by the distance pieces must be filled. If it is desired to provide more positive positioning of the mould relative to the last, set screws shown in dotted outline at 60, may be used to bolt the mould to the last. This method may supplement or replace the method described using the bracket 32 and rods 24.

The webs 18 break up the sole unit of the boot so that it has better non-slip properties. Furthermore the indentations in the sole unit formed by the webs 18 bring about full heat penetration in the sole unit during the curing of the boot. This is important since the thickness of the sole unit is much greater than that of the rest of the boot and the curing of the boot could otherwise be faulty. Indeed there is a limit to the thickness of the sole unit since, despite the provision of webs a sole unit which is too thick would not cure properly. Clearly the method has application to any suitable type of footwear and thus, for an article having a thin sole, the webs could be of different pattern or even be omitted altogether. Equally the mould could be used to form the heel of the article only, the sole proper being constituted simply by the material adhering to the last or by a separate element glued to the article in the conventional way. Raising the height of the walls 16 relative to the bottom 33 of the last results in a boot the lower portion of which immediately adjacent the sole unit is thicker than that shown. This might be desirable for heavy duty boots.

The method and apparatus may be employed to produce an article of footwear having a lining. As shown in FIG. 6 this lining 60 may be a knitted or machined sock or a lining made up of canvas. The lining may or may not have a tongue. The lining 60 is slipped over the last 62 prior to dipping in the liquid PVC. After completion of the curing, the article 64 is removed from the last as described. If the lining has eyelets these are cleaned out and the tongue sewn in if the tongue was not attached to the lining prior to dipping. The article 64 shown in FIG. 6 is provided with a preformed element 66 of any suitable material such as cork or wood. This element 66 constitutes in the finished article part of the sole unit. The element 66 is located under the last 62 prior to dipping and takes the place of the mould previously described since in the dipping process plastics material flows into the space 69 between the upper surface 70 of the element 66 and the bottom of the last 62 and is retained therein by walls 68 (shown in dotted outline). However, provided the width of the space (i.e. the distance between the upper surface 70 of the element and the bottom of the last 62) is not too great the walls may be omitted. The material which solidifies in the space 69 thus forms part of the sole unit of the finished article.

Since the quality of the adhesion between the plastics material and the element 66 may be doubtful, keying holes 72 may be drilled in the element 66, the plastics material flowing into these holes and mechanically keying the element 66 to the article.

Articles of footwear may where necessary be formed by hand dipping the assembly comprising the mould and last.

Of course any suitable plastics other than PVC may be employed.

I claim:

1. In a method for making an article of footwear having an upper and a sole unit comprising a sole region and a heel, including dipping a last in a fluid plastics material and hardening said plastics material about said last, the improvement comprising:
   supporting an element spaced from a sole portion of said last during said dipping so that said last and said element are immersed in said plastics material and said plastics material flows between said last and said mold element; and
   retaining said material between said element and said last to form at least a part of said sole unit of said article.

2. A method according to claim 1, in which the element is a mold for molding the said part of the sole unit.

3. A method according to claim 1, in which the element is a preformed part of the sole unit.

4. Apparatus for making an article of footwear having an upper and a sole unit comprising a sole region and a heel by dip coating a mold, comprising:
   a mold element;
   a last upon which the upper can be formed; and
   means for spacing a portion of said mold element from a sole portion of said last,
   said portion of said mold element and said sole portion of said last defining a cavity for forming a portion of said sole unit; said last and said mold element having a clear gap between and around said mold element and said last through which fluid plastics material can flow during said dip coating;

a container adapted to hold a bath of hardenable fluid plastics material and means to support said last and said mold element immersed in said bath.

5. The apparatus of claim 4, wherein:

said mold element is configured so as to form said portion of said sole unit having projections thereon adapted to give said portion of said sole unit non-slip properties.

6. The apparatus of claim 4, wherein:

said mold element has upstanding webs adapted to form indentations in said portion of said sole unit and a wall peripherally about said element defining an open mold cavity.

7. The apparatus of claim 4, wherein:

said mold element is adapted to receive a formed member to be bonded to said upper as a result of said dip coating so that said member thereby becomes part of said sole unit.

* * * * *